J. W. PLACE.
PRESSURE GAGE.
APPLICATION FILED JAN. 19, 1920.
1,345,630.
Patented July 6, 1920.
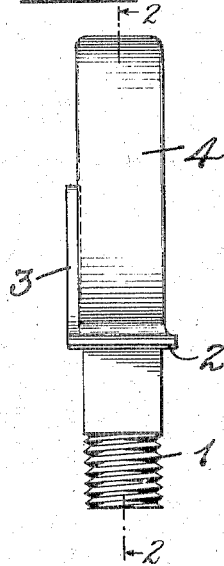
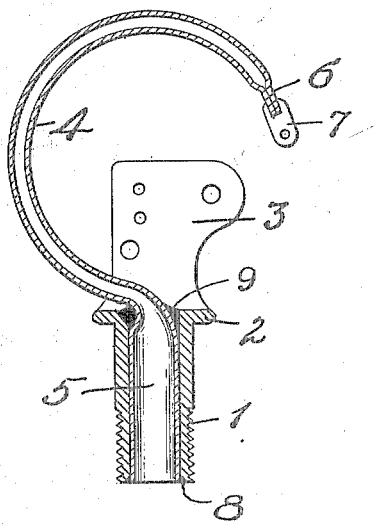
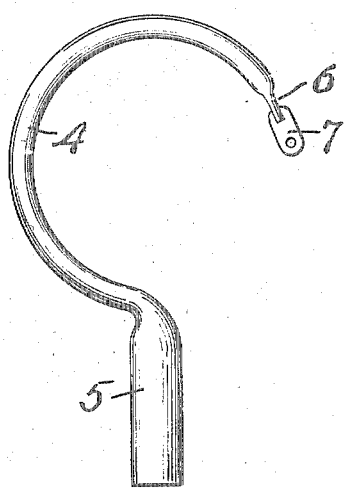
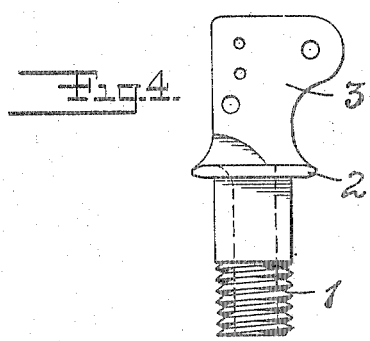
Inventor.
J. W. Place,
By his Attorneys.
Mitchell & Allyn

UNITED STATES PATENT OFFICE.

JOSIAH W. PLACE, OF NEW YORK, N. Y., ASSIGNOR TO UNITED STATES GAUGE CO., OF NEW YORK, N. Y., A CORPORATION OF NEW YORK.

PRESSURE-GAGE.

1,345,630.  Specification of Letters Patent.  Patented July 6, 1920.

Application filed January 19, 1920. Serial No. 352,483.

*To all whom it may concern:*

Be it known that I, JOSIAH W. PLACE, a citizen of the United States of America, residing at New York, N. Y., have invented a new and useful Pressure-Gage, of which the following is a specification.

My invention relates to improvements in pressure gages of the type intended to register high pressure, and in which a Bourdon tube is employed. In the manufacture of such devices, it is highly desirable that the Bourdon tube should be very rigidly mounted so as to be securely held against dislodgment by vibrations, etc. The device includes a mounting for the tube which, when the article is complete, forms a threaded plug or nipple as well as a support for the gage mechanism including the case or housing. If practical, it would be highly desirable to make the tube and the nipple of one piece and integral, and in some instances this has been done, but in such cases there are manufacturing difficulties which operate to the injury of the finished article, for example, it is necessary that the tube should be accurately tempered. If the tube were integral with the nipple and the latter were made heavy enough to be serviceable, it would be practically impossible to properly temper the tube throughout its effective length. This difficulty I have overcome. Again, by making the nipple as a piece separate from the tube, I am enabled to give to the former any desired shape, to adapt it to any sort of a case or housing and to even provide as a part of the nipple a mounting for the gage mechanism operated by the tube.

The foregoing and other advantages will be apparent to a mechanic skilled in this art from a reading of the following description and an examination of the accompanying drawings, in which:

Figure 1 is an edge elevation of my complete tube and socket.

Fig. 2 is a section on the line 2—2 of Fig. 1.

Fig. 3 is a side elevation of the tube alone.

Fig. 4 is a side elevation of the nipple.

1 represents the nipple proper which is of socket formation, that is to say, it is provided with a central passage to receive the end of the tube. At the upper end of the nipple body I usually provide a flange 2, while at the back of the nipple body I provide an upward extension 3 which forms a mounting plate to which may be secured the case or housing, not shown, and upon which may also be mounted the gage mechanism, not shown. 4 represents the curved flattened portion of a Bourdon tube which at one end is provided with a symmetrical tubular extension 5 which is adapted to fit with reasonable snugness into the socketed portion of the nipple 1. At the opposite end of the curved portion 4 of the tube the walls of the tube are brought together and welded or otherwise permanently closed, as indicated at 6. 7 represents a lug carried by the end 6 of the tube and to which the gage mechanism is attached so that when the tube expands and contracts, said gage mechanism will be operated.

The Bourdon tube is made from steel of the desired size and thickness and when given its desired final form is subjected to a proper tempering operation so that it will be properly tempered throughout its entire length. The length of the part 5 of the tube is such that it will pass substantially through the bore of the nipple so that a relatively long bearing wall will be provided between these two parts. After the tube has been properly tempered the end 5 is sweated or soldered into the bore of nipple 1 preferably throughout its length. If desired, the lower end of the nipple may be slightly countersunk as indicated in Fig. 2 so that a small ring 8 of solder may be applied at this point. At the other end of the nipple any space around the tube may be filled in with solder as indicated at 9. I have found that this method of uniting these two parts does not in any way injuriously affect the temper of the tube. I have also found that an effective gas tight joint may be thus provided between the nipple and the tube and that the finished article possesses all of the advantages of integrality without being made from one piece.

It will be understood of course, that I have shown and described my invention only in one preferred form, and that I contemplate that reasonable modifications may be made without departing from the spirit and scope thereof. I have not shown the gage case or housing nor the gage mechanism to be operated by the Bourdon tube since these parts are well known and understood, and no invention as to the same is claimed herein.

The nipple, lug and extension may be formed in any desired way as by drop-forging or casting and of such metal as may be effectively soldered to the steel tube.

What I claim is:

1. In a pressure gage, a nipple threaded on its outside and constructed to form a socket for a Bourdon tube, a Bourdon tube formed separately from said nipple and having a curved flattened portion and a straight tubular portion bent at an angle relatively to the curved portion, said straight portion projecting through said nipple and accessible at both ends thereof for soldering, and means carried by the nipple constituting a mounting for gage mechanism.

2. In a pressure gage, a nipple threaded on its outside and having a central bore forming a socket, a Bourdon tube having a curved flattened portion and a straight tubular portion at one end thereof bent at an angle relatively to the curved portion, the opposite end of the curved portion of the tube being closed, the straight portion being mounted in the bore of said nipple and accessible at both ends thereof for the application of solder or the like.

3. In a pressure gage, a nipple threaded on its outside and having a central bore forming a socket, a Bourdon tube having a curved flattened portion and a straight tubular portion at one end thereof bent at an angle relatively to the curved portion, the opposite end of the curved portion of the tube being closed, the straight tubular portion being mounted in the bore of the nipple and accessible at both ends thereof for the application of solder or the like and a mounting for gage mechanism carried by said nipple, said mounting comprising a plate formed integrally therewith.

JOSIAH W. PLACE.